US006778671B1

(12) United States Patent
Graumann

(10) Patent No.: US 6,778,671 B1
(45) Date of Patent: Aug. 17, 2004

(54) METHOD OF REFERENCE TO ECHO TIME ALIGNMENT FOR FACILITATION OF ECHO CANCELLATION

(75) Inventor: David L. Graumann, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/210,639

(22) Filed: Dec. 14, 1998

(51) Int. Cl.[7] .............................. H04B 3/20; H04M 9/00
(52) U.S. Cl. ..................................... 381/66; 379/406.01
(58) Field of Search ................................ 381/71.9, 94.7, 381/94.9, 71.11–71.12, 66; 379/406.01–406.16; 370/289, 286; 455/570

(56) References Cited

U.S. PATENT DOCUMENTS

| | | | | |
|---|---|---|---|---|
| 4,582,963 A | * | 4/1986 | Danstrom | 179/170 |
| 5,263,019 A | * | 11/1993 | Chu | 370/406 |
| 5,664,011 A | * | 9/1997 | Crochiere et al. | 379/410 |
| 5,721,782 A | * | 2/1998 | Piket et al. | 381/66 |
| 6,085,072 A | * | 7/2000 | Komiya | 379/406 |
| 6,108,720 A | * | 8/2000 | Tal et al. | 379/406 |
| 6,181,753 B1 | * | 1/2001 | Takada et al. | 375/346 |
| 6,272,173 B1 | * | 8/2001 | Hatamian | 375/229 |
| 6,320,958 B1 | * | 11/2001 | Sekine | 379/406.01 |
| 6,389,440 B1 | * | 5/2002 | Lewis et al. | 708/322 |

OTHER PUBLICATIONS

Omologo et al, "Acoustic Event Localization Using a Cross-power–Spectrum Phase Based Technique", IEEE, 0–7803–1775–0/94, pp. II–273 through II–276, 1994.
Reed et al, "Time Delay Estimation Using the LMS Adaptive Filter–Static Behavior", IEEE, 0096–3518/81/0600–0561, pp. 561–576, 1981.

* cited by examiner

Primary Examiner—Duc Nguyen
Assistant Examiner—Lun-See Lao
(74) Attorney, Agent, or Firm—John F. Kacvinsky

(57) ABSTRACT

In an echo cancellation system, an echo canceler has an echo channel signal input, a reference channel signal input and a control output, the two inputs being uncorrelated, and a delay buffer has an input for a reference channel signal, an output in communication with reference channel signal input and a control input in communication with the control output from the echo canceler.

3 Claims, 4 Drawing Sheets

METHOD OF REFERENCE TO ECHO TIME ALIGNMENT FOR FACILITATION OF ECHO CANCELLATION

BACKGROUND

The present invention relates to an echo canceler provided in a data processing system.

Echo cancelers are known per se. In many audio applications, a first audio signal is broadcast from an audio output device such as a speaker. The first audio signal may be captured by an audio input device such as a microphone and returned to the signal's source. The audio input device also may capture other audio signals. The first audio signal, often called the "echo," may interfere with the intelligibility or perceived quality of the other audio signals. Echo cancelers are used to remove the echo signal but permit the other audio signals to remain.

FIG. 1 illustrates an audio sub-system of a known data processing system in which echo cancellation may be used. The audio sub-system receives and buffers audio data, called the "reference channel," to be output from the system. The audio sub-system also captures and buffers ambient audio in a second channel, called the "echo channel." It delivers the echo channel to the data processing system.

The audio subsystem includes an echo canceling system 100, an output device 200 and an input device 300. The echo canceling system 100 includes an audio rendering filter 110 and an echo canceler 120. The audio rendering filter 110 receives and formats as necessary the reference channel. It outputs audio data to the output device 200.

The output device 200 includes a buffer 210 ("output buffer") and a speaker 220 or other announcement device ("speaker"). As is known, the output device 200 also may include a controller and device driver equipment (not shown). The reference channel is received from the echo cancellation system at the output buffer 210. The output buffer 210 stores the reference channel for a predetermined period of time before delivering it to the speaker 220. The reference channel is output from the output device 200 through the speaker 220. As the reference channel is output from the output buffer 210 to the speaker 220, a copy of the reference channel is delivered to the input device 300 over line 230.

The input device 300 includes its own buffer 310 ("input buffer") and a microphone 320 or other audio capture device ("microphone"). The microphone 320 captures audio data and generates an echo channel signal therefrom. It delivers the echo channel signal to the input buffer 310. The input buffer 310 stores the echo channel for a predetermined period of time, then delivers it to the echo cancellation system 100.

The input buffer 320 also receives a copy of the reference channel from the output device 200. It buffers the reference channel for a predetermined period of time then delivers it to the echo canceler 120.

FIG. 1 figuratively illustrates the echo phenomenon that may occur in a speakerphone type of implementation of the audio sub-system. Assume that the audio sub-system is provided in a 10'×10' room. When the reference channel is output by the speaker 220, sound energy may travel to the microphone 320 through a variety of different paths, P1–P4. The shortest path is provided on a direct path P1 from the speaker 220 to the microphone 320. It is associated with a first delay. Other paths P2–P4 may occur because of reflections from nearby objects such as wall surfaces, people and things. Each path is associated with its own delay. Of course, people and things (including the speaker and microphone) may move which can cause the delay and/or attenuation of the various paths to change with time. The echo channel captured by the microphone 320 is, in fact, an aggregate of a variety of reflections that may occur in a particular environment. The echo channel may include an echo signal that represents the multiple echos of paths P1–P4 and also other signals representing audio generated at the microphone 320 such as input speech.

The echo canceler 120 receives the reference signal having been delayed by the input and output buffers 210–310 and the captured echo channel from the input device 300. For the echo canceler 120 to operate effectively, it must receive an onset of the echo signal within a predetermined positive offset from its receipt of the corresponding signal in the reference channel. The echo canceler 120 typically stores only a predetermined portion of the reference channel (e.g. 60–200 msec). If the acoustical echo signal corresponding to the buffered portion is not received within the 60–200 msec window, the echo canceler 120 will have discarded the portion of the reference channel when the echo signal is received. The echo canceler 120 would neither recognize the echo signal as echo nor cancel it in this case.

Traditional computer audio systems include "correlated audio" device drivers that can measure the delay imposed by the input and output buffers 210, 310. The same buffering is applied to both the reference channel and the echo channel. Accordingly, only the delay of paths P1–P4 contribute to any skew between the reference channel and an echo signal contained in the echo channel. Adaptive filtering at the echo canceler 120 approximates the delay of sound paths P1–P4 to correct for the skew.

Modern computer systems may discontinue use of the correlated audio device drivers that makes the precise delay tuning possible. Thus, there is a need in the art for an audio system that maintains time alignment between a reference channel and an echo channel even in the absence of correlated audio device drivers.

SUMMARY

An embodiment of the present invention provides an echo cancellation system in which an echo canceler has an echo channel signal input, a reference channel signal input and a control output, the two inputs being uncorrelated, and a delay buffer has an input for a reference channel signal, an output in communication with reference channel signal input and a control input in communication with the control output from the echo canceler.

DETAILED DESCRIPTION

The present invention provides a method of determining and correcting skew between a reference channel and an echo signal in an echo cancellation system. The method identifies a time of the onset of an echo signal in the echo channel. Based upon the onset of the echo signal, the method adjusts the arrival time of the reference channel to bring it into time alignment with the echo channel. The onset of the echo signal may be determined by peak detection, envelope onset detection, or other signal detection techniques.

Figure 1:
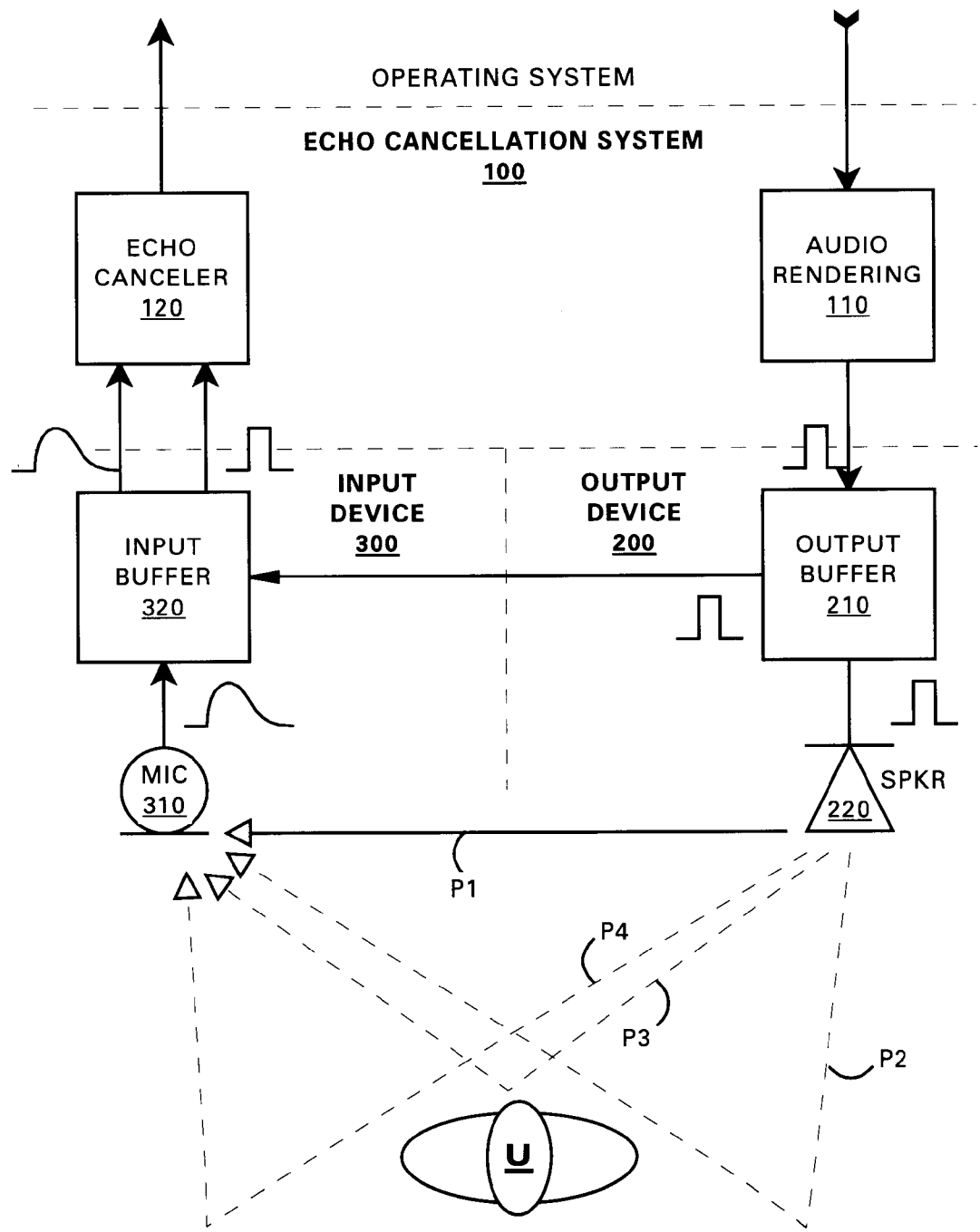
FIG. 1 illustrates an audio processing system as is known in the art.
Figure 2:
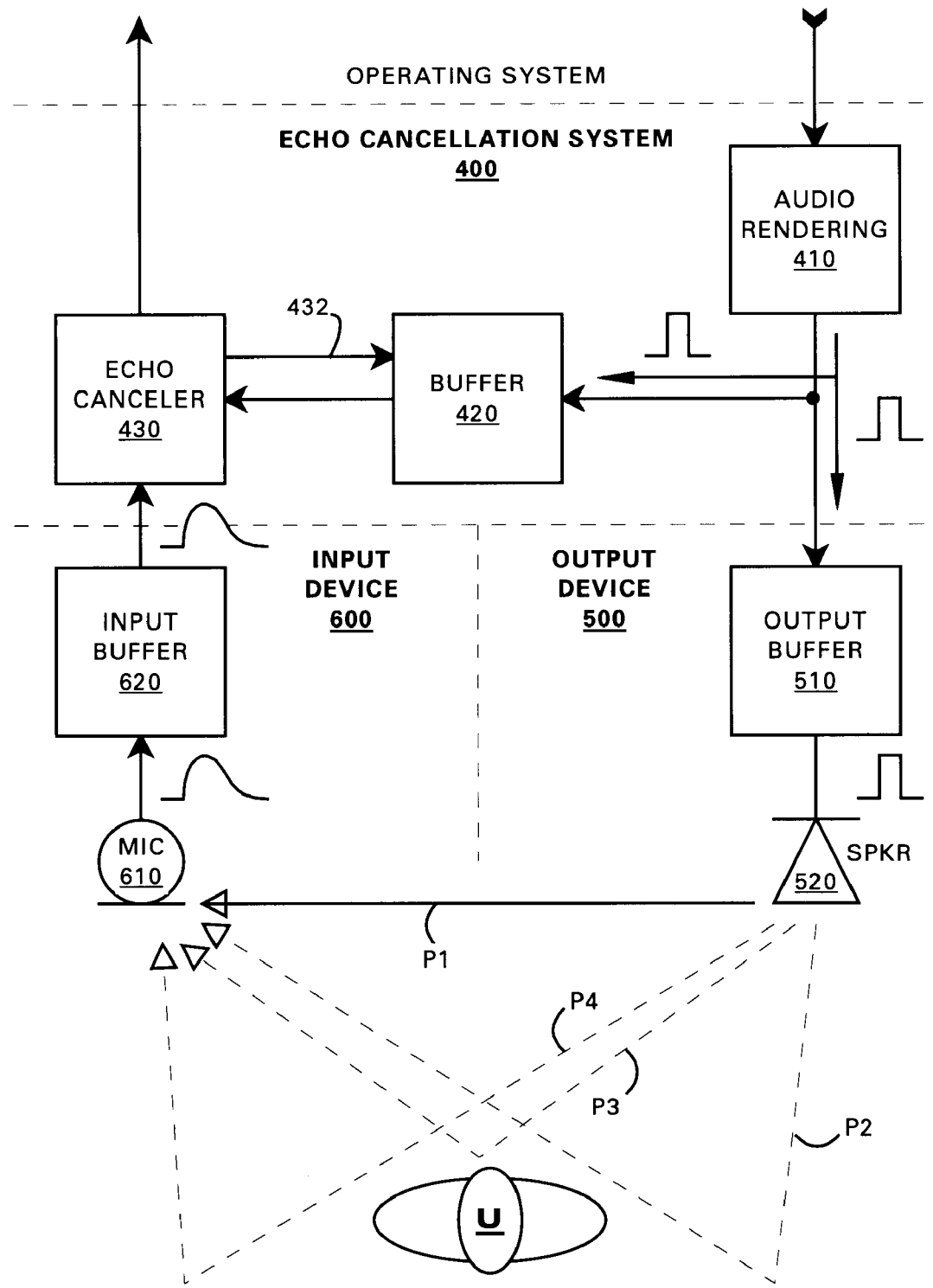
FIG. 2 illustrates an audio processing system constructed in accordance with an embodiment of the present invention.

Turning now to FIG. 2, there is shown an audio system constructed in accordance with an embodiment of the present invention. The audio system, as in known systems, may include an echo cancellation system 400, an output device 500 and an input device 600. The output device 500 may include an output buffer 510 and a speaker 520. The input device 600 may include an input device 610 and a microphone 620. The input device 600 and output device 500 are not correlated; a copy of the reference channel does not propagate directly from the output device 500 through the input device 600 to the echo cancellation system 400.

The echo cancellation system 400 includes a rendering filter 410, a buffer 420 and an echo canceler 430. The rendering filter 410 receives and formats the reference channel as necessary. It outputs audio data to the buffer 420 and to the output device 500. The buffer 420 stores a predetermined portion of the reference channel and outputs it to the echo canceler 430. The echo canceler 430 performs acoustic echo cancellation upon an echo channel received from the input device 600 based upon its receipt of the reference channel received from the buffer 420. The echo canceler 430 also controls the buffer 420 over line 432 to determine an amount of delay imposed on the reference channel by the buffer 420. The echo canceler 430 may cancel echos from the echo channel based upon any of a number of known echo cancellation algorithms.

Figure 3:
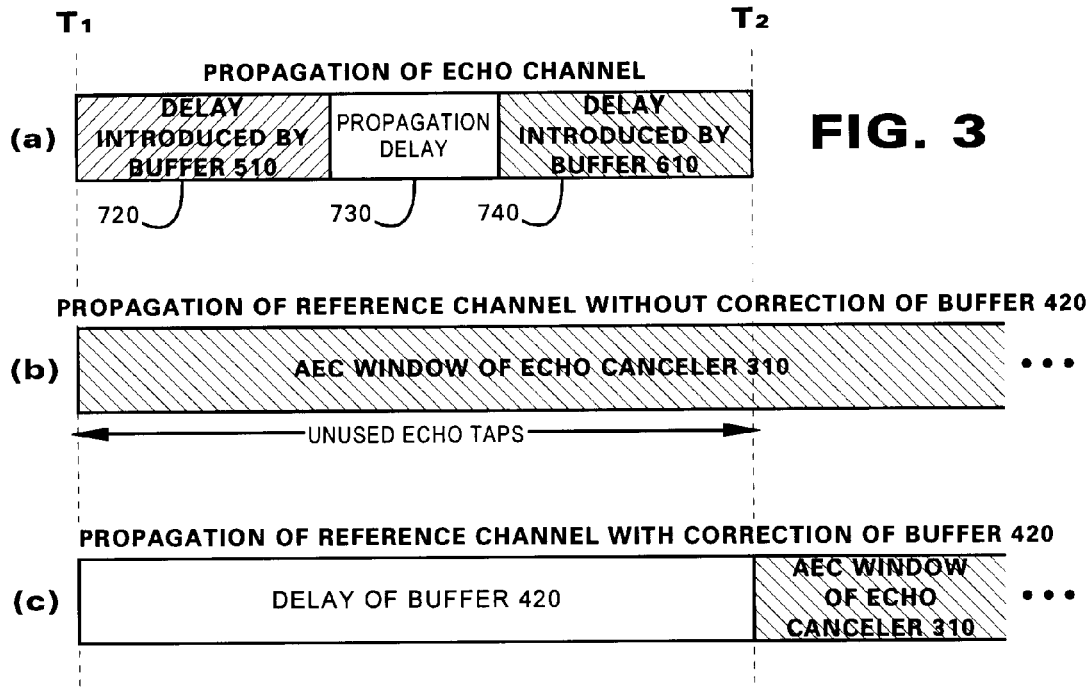
FIG. 3 illustrates operative principles underlying an embodiment of the present invention.

The time bars (a)–(c) of FIG. 3 illustrate some operative principles underlying an embodiment of the present invention. Time bar (a) represents propagation of signals forming the echo signal as it propagates from the output device 500 through to the input of the echo canceler 430. The echo signal experiences delays as the reference channel propagates through the output buffer 510 (bar 710), the propagation paths P1–P4 (720) and the input buffer 610 (730). Thus, if a part of the reference channel is output from the echo cancellation system 300 at time T1, T2 is the earliest time that the echo canceler 430 will receive an echo signal based on the reference channel.

Time bar (b) represents operation of the echo canceler 430 that would occur without the presence of the buffer 420. As the reference channel is output to the output device 500 at time T1, it also would be input to the echo canceler 430. The echo canceler would begin processing of the echo channel, looking for a correlation between the reference channel and a signal in the echo channel. Because of the propagation delays noted in time bar (a), the echo canceler could not find any such correlation until the onset of the echo channel at time T2. As is known, an echo canceler 430 includes tap weights associated with the predetermined delays of a reference channel. In the example of time bar (b), the tap weights of the echo canceler 430 associated with times between T1 and T2 would not be used effectively, they would be set to zero, because there would be no echo signal to cancel. Although the echo canceler 430 would detect the onset of the echo signal within its AEC window and cancel some of it, the echo cancellation would be sub-optimal.

In time bar (c), FIG. 3 illustrates the propagation of the reference channel using a delay buffer 420. The delay buffer 420 imposes a delay upon the reference channel that mimics the delay of the output buffer, propagation paths and input buffer imposed upon the echo channel. Thus, the onset of the reference channel is closely aligned to the onset of the echo signal at time T2. The tap weights that in the example of time bar (b) were left unused would be non-zero in the example of time bar (c). Thus, this embodiment of the present invention results in full use of the AEC window and more effective utilization of an echo canceler.

Figure 4:
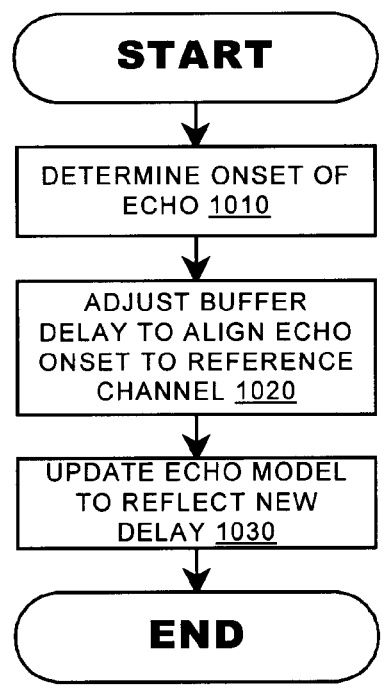
FIG. 4 illustrates a method of operation of an embodiment of the present invention.

According to an embodiment of the present invention, the echo canceler 430 operates in accordance with the method of FIG. 4. First, the echo canceler 430 monitors the echo channel to determine an onset of the echo signal therein (Step 1010). Second, the echo canceler 430 adjusts the timing of the output of the reference channel to bring the echo signal into time alignment with the reference channel (Step 1020). Third, the echo canceler adjusts its echo model to reflect this new time shift in the reference signal (Step 1030).

Echo cancellation algorithms often perform "adaptive filtering" of the echo channel. According to an embodiment of the present invention, the echo canceler determines skew between the reference channel and the echo channel by interrogating time domain error coefficients that are obtained from the adaptive filtering process. The magnitudes of such coefficients often approximate a decaying exponential function initiated from a first direct acoustical path (P1) or, in its absence, the strongest point of acoustical reflection. The position of the coefficient peaks may be used to determine the onset of the echo signal.

Figure 5:
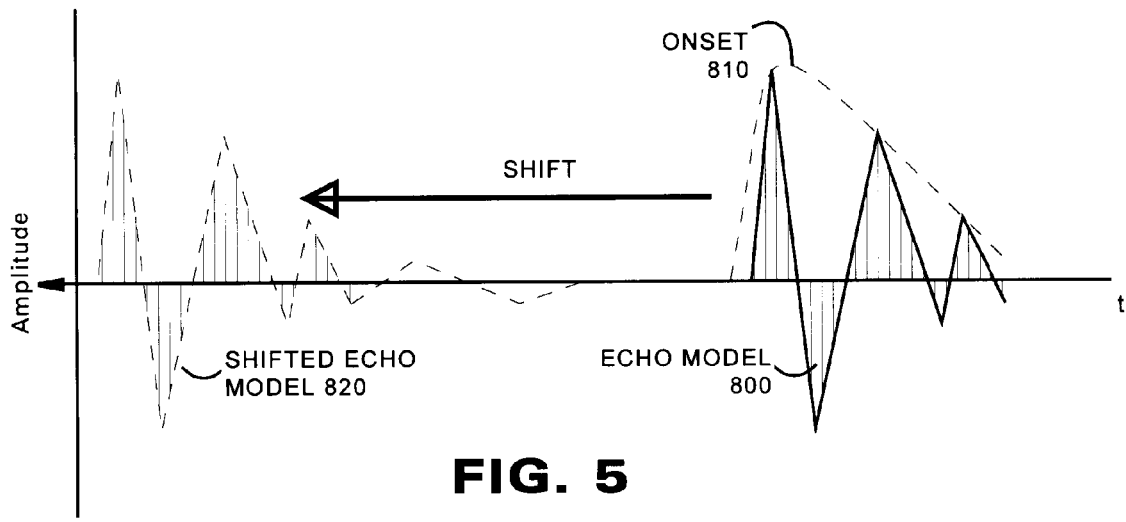
FIG. 5 illustrates time-alignment of an echo signal in relation to the capacity of the echo canceler and the buffer.

FIG. 5 illustrates an exemplary time domain echo model 800 that may be created by an echo cancellation method using an embodiment of the present invention. The vertical strips represent weights of a tapped-delay-line used in conventional finite impulse response filtering of the reference channel. The echo model 800 is shown with reference to a time axis in which t=0 identifies the time when reference channel is delivered to both the output device 500 and buffer 420 (FIG. 2).

During initial operation of the method of FIG. 4, the echo model is not time-aligned with the reference channel. The entire echo signal (which, in a digital system, may be represented by a plurality of digital time samples) is modeled as a linear combination of the reference signal. According to a first embodiment of the present invention, an onset 810 of the echo signal may be determined by identifying a first local maximum of the magnitude of the tap weight coefficients. For example, the echo canceler may receive each of the tap weight coefficients, square them and identify the first local maximum thereof:

$t_{ONSET}$=time(max($coeff_i^2$)), $i$=0 to $n$, where $n$ is the number of tap weights.

The onset of the echo signal is the skew between it and the reference channel. The echo canceler 430 may cause the buffer 420 to delay further the reference signal in an amount equal to or slightly less than the determined skew. The shifted echo model 820 is shown in phantom in FIG. 5.

Alternatively, the onset of the echo may be determined by examining an energy envelope of the echo model. The echo canceler 430 identifies a maximum (or first local maximum) of the energy envelope of the echo model and determines the maximum to be the onset of the echo signal. Again, it controls the buffer 420 to shift this determined onset toward the start of the AEC window.

Figure 6:
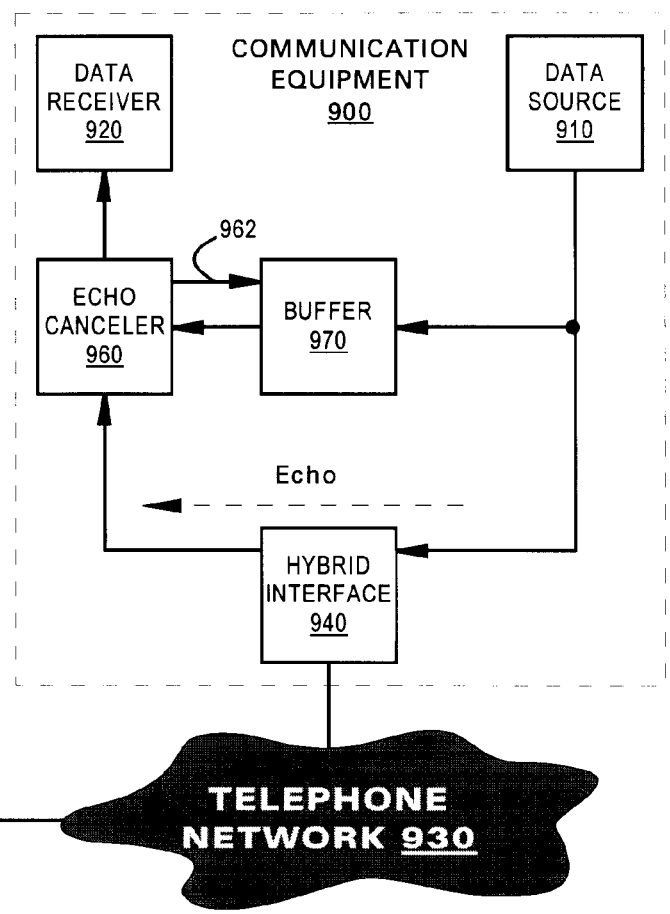
FIG. 6 illustrates an echo cancellation system constructed in accordance with an embodiment of the present invention.

FIG. 6 illustrates an echo cancellation system constructed in accordance with another embodiment of the present invention. FIG. 6 illustrates an embodiment of the present invention as applied to line echo cancellation. As is known, echo cancelers are used in a telephone system to cancel reflections from various communication interfaces present in a telecommunication link, such as a 2 wire to 4 wire interface (also known as a "hybrid" interface).

As shown in FIG. 6, communication equipment 900 may include a data source 910 and a data receiver 920 provided in communication with a telephone network 930. A hybrid interface 940 interconnects the communication equipment with the telephone network and may be a source of echo. Output signals from the data source may be reflected back to the data receiver and interfere with a desired signal received at the hybrid interface from the telephone 950.

According to an embodiment of the present invention, the communication equipment may be provided with an echo canceler 960 and delay buffer 970. The delay buffer 970 receives a copy of a reference channel, delays it and inputs the delayed reference channel to the echo canceler 960. The echo canceler 960 receives not only the delayed reference channel but also an echo channel from the hybrid interface 940. The echo canceler 960 also may receive other echoes generated by reflections from points within the telephone network 930 (points not shown).

For those echo signals that arrive to the echo canceler 960 within the AEC window, the echo canceler 960 may operate in accordance with the method of FIG. 4 to identify an onset of the echo signal, then control the delay of the delay buffer 970 to time align the reference channel with the echo signal. The echo canceler 960 controls the delay of the echo over control line 962.

The preceding discussion has presented embodiments of the present invention in an acoustic echo canceling application. However, it should be understood that the scope of the present invention is not so limited.

Several embodiments of the present invention are specifically illustrated and described herein. However, it will be appreciated that modifications and variations of the present invention are covered by the above teachings and within the purview of the appended claims without departing from the spirit and intended scope of the invention.

I claim:

1. An audio system for a computer, comprising:
    an input device, comprising a microphone and a first buffer to store data captured by the microphone,
    an output device, comprising a speaker and a second buffer to store data to be output by the speaker, and
    an echo cancellation system comprising:
        a third buffer, wherein inputs of the second and third buffer are coupled to a common source, and
        an echo canceler, having:
            a first input coupled to an output of the first buffer,
            a second input coupled to the output of the third buffer,
            a first output for an echo-canceled audio signal, and
            a second control output coupled to the third buffer,
        the third buffer to delay propagation of an input signal to the echo canceler by an amount determined by a signal present on the second control output.

2. The audio system of claim 1, wherein the common source is an operating system of a computer.

3. The audio system of claim 1, wherein the echo canceler outputs the echo canceled audio signal to an operating system of a computer.

\* \* \* \* \*